Figure 1:
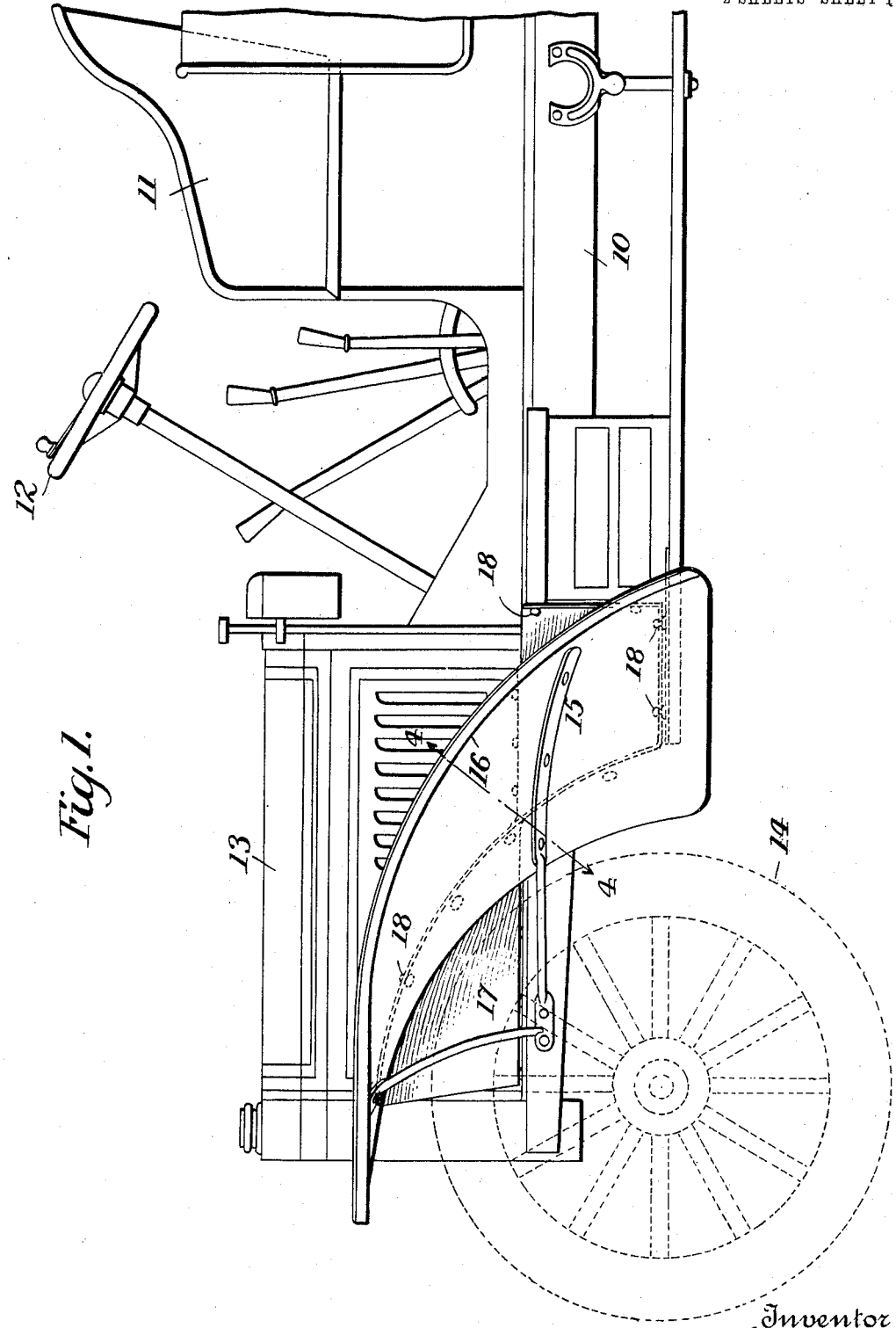

No. 821,751. PATENTED MAY 29, 1906.
C. SCHMIDT.
MUD GUARD FOR MOTOR VEHICLES.
APPLICATION FILED MAR. 10, 1905.

2 SHEETS—SHEET 1.

Witnesses
Inventor
Charles Schmidt
By Foster Freeman Watson
Attorneys

No. 821,751. PATENTED MAY 29, 1906.
C. SCHMIDT.
MUD GUARD FOR MOTOR VEHICLES.
APPLICATION FILED MAR. 10, 1905.
2 SHEETS—SHEET 2.
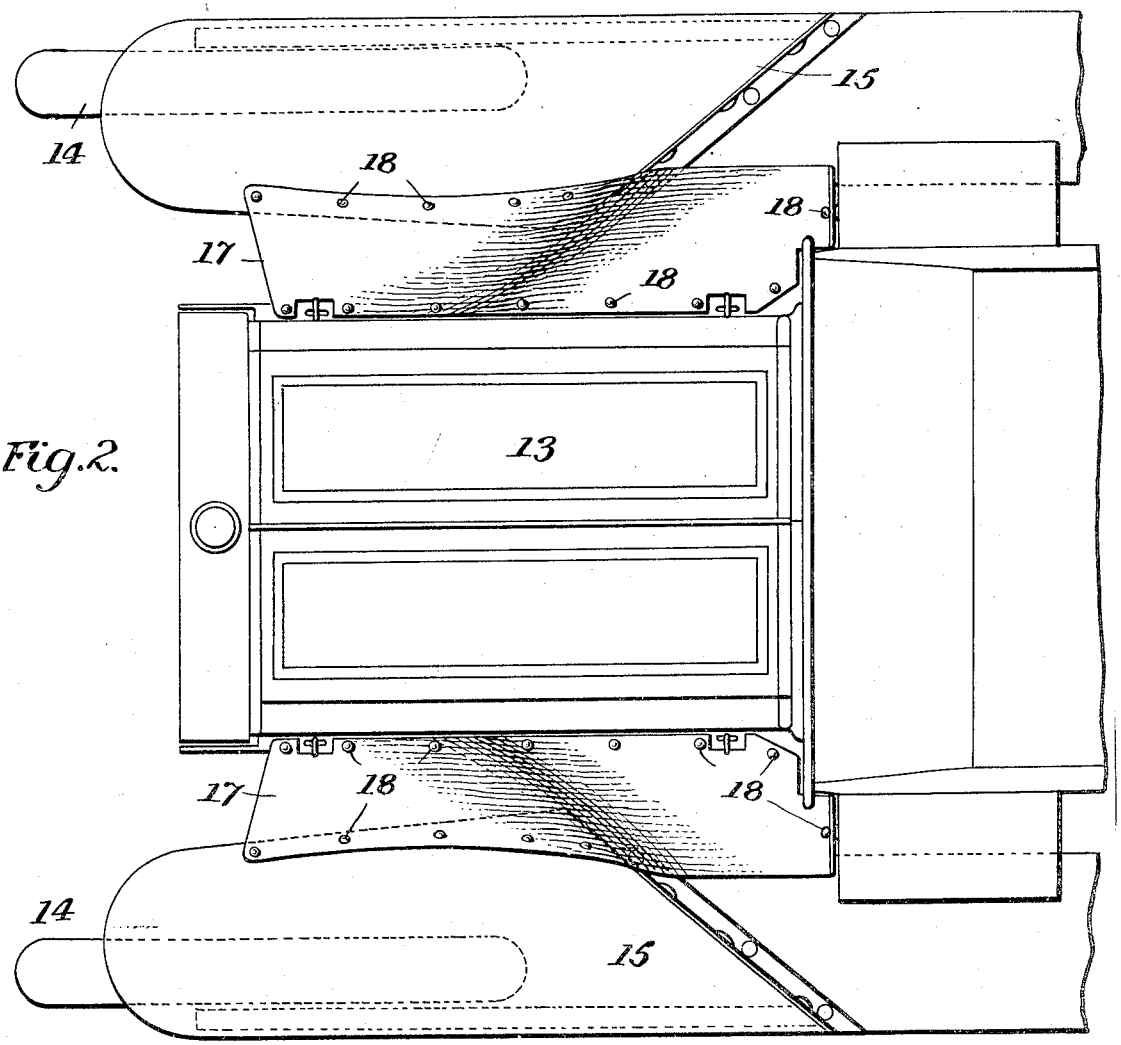
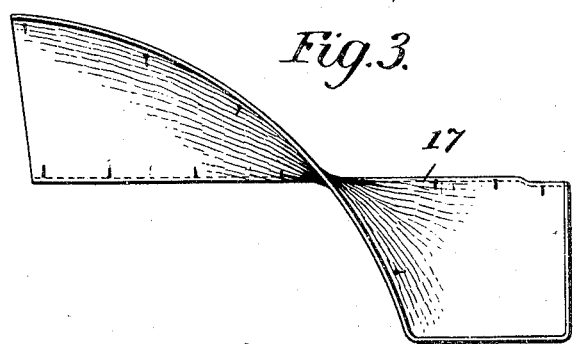
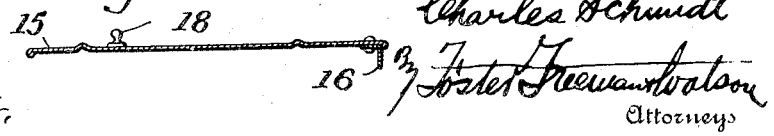

UNITED STATES PATENT OFFICE.

CHARLES SCHMIDT, OF DETROIT, MICHIGAN, ASSIGNOR TO PACKARD MOTOR CAR COMPANY, OF DETROIT, MICHIGAN, A CORPORATION OF WEST VIRGINIA.

MUD-GUARD FOR MOTOR-VEHICLES.

No. 821,751. Specification of Letters Patent. Patented May 29, 1906.

Application filed March 10, 1905. Serial No. 249,443.

*To all whom it may concern:*

Be it known that I, CHARLES SCHMIDT, a citizen of France, residing at Detroit, in the county of Wayne, State of Michigan, have invented certain new and useful Improvements in Mud-Guards for Motor-Vehicles, of which the following is a specification.

This invention comprises improvements in mud-guards for motor-vehicles; and its object is to prevent the mud which is thrown up by the wheels from being blown into the vehicle or upon the occupants thereof.

The invention will be described in connection with the accompanying drawings, in which—

Figure 1 is a side elevation of the forward part of a motor-vehicle, one of the front wheels being shown in dotted lines. Fig. 2 is a plan view of a portion of the front of the vehicle. Fig. 3 is a side view of a flexible and detachable mud-guard; and Fig. 4 is a section through the rigid guard on the line 4 4, Fig. 1.

Referring to the drawings, 10 indicates the body of the vehicle; 11, the seat; 12, the steering-handle; 13, the housing for the engine, which is usually placed in the front of the vehicle, and 14 the wheels. Over the wheels are relatively fixed rigid mud-guards 15, which are preferably permanently connected to the frame of the machine. When the vehicle is moving rapidly, fluid which strikes the mud-guards tends to move laterally toward the inner and outer edges of the guards and a considerable portion of the mud and water which is thrown against the end surfaces of the mud-guards is forced laterally by the air-pressure to the edges of the mud-guards and is then caught by the wind and carried back into the vehicle. To prevent the mud and water from thus escaping freely from the outer edges of the guards, a vertical depending flange 16 is provided at the outer edge of each guard. This flange collects the mud and water and guides it rearwardly and also gives it a tendency to drop instead of blowing out laterally.

Between the vehicle-body and the inner sides of the mud-guards 15 I provide flexible guards 17, constructed of leather or other suitable light fabric. These flexible guards can be detached and stored away during dry weather, and in wet or muddy weather they can be readily connected to the vehicle. They are preferably united to the vehicle-body and to the fixed mud-guards by buttons or knobs 18, which engage buttonholes in the fabric. Any other suitable fastening devices may be employed.

The flexible mud-guards are preferably constructed to conform at their outer edges to the fixed mud-guards and at their inner edges to the straight lines of the vehicle-body. The flexible guards when in use have therefore a warped surface, as indicated in Fig. 3.

The flexible guards described cover the entire space between the fixed guards and the vehicle-body and effectually prevent any mud or water from being thrown into the vehicle or upon its occupants, thus avoiding the great annoyance heretofore experienced by automobile users in wet weather.

Having described my invention, what I claim, and desire to secure by Letters Patent, is—

1. In a motor-vehicle, the combination with the vehicle-body and the wheels, of the relatively fixed mud-guards extending over said wheels, and the flexible and detachable mud-guards extending between the fixed mud-guards and the vehicle-body.

2. In a motor-vehicle, the combination with the vehicle-body and the wheels, of the relatively fixed mud-guards extending over the wheels, and the flexible mud-guards between the fixed mud-guards and the vehicle-body, the outer edges of said flexible guards being detachably connected to the fixed guards, and the inner edges of said flexible guards being detachably connected with the vehicle-body, for the purpose set forth.

3. In a motor-vehicle, the combination with the vehicle-body and the vehicle-wheels, of the fixed mud-guards extending over the wheels, and the warped flexible mud-guards between the fixed guards and the vehicle-body, the said flexible guards being detachably connected at their outer edges by suitable fastenings with the fixed mud-guards and at their inner edges by suitable fastenings with the vehicle-body, for the purpose set forth.

In testimony whereof I have signed my name to this specification in the presence of two subscribing witnesses.

CHARLES SCHMIDT.

Witnesses:
 RUSSELL HUFF,
 MARK C. TAYLOR.